United States Patent
Mallesan

(10) Patent No.: US 7,626,929 B2
(45) Date of Patent: Dec. 1, 2009

(54) METHODS AND APPARATUS FOR PREDICTIVE CALL ADMISSION CONTROL WITHIN A MEDIA OVER INTERNET PROTOCOL NETWORK

(75) Inventor: Saravanan Mallesan, Fairfax, VA (US)

(73) Assignee: GENBAND Inc., Plano, TX (US)

( * ) Notice: Subject to any disclaimer, the term of this patent is extended or adjusted under 35 U.S.C. 154(b) by 146 days.

(21) Appl. No.: 11/690,348

(22) Filed: Mar. 23, 2007

(65) Prior Publication Data

US 2008/0159136 A1      Jul. 3, 2008

Related U.S. Application Data

(60) Provisional application No. 60/882,253, filed on Dec. 28, 2006.

(51) Int. Cl.
*H04L 1/00*      (2006.01)
(52) U.S. Cl. .................... 370/230; 370/395.2
(58) Field of Classification Search ......... 370/229–238, 370/252–253, 352–356, 401
See application file for complete search history.

(56) References Cited

U.S. PATENT DOCUMENTS

| | | | |
|---|---|---|---|
| 6,775,269 B1 | 8/2004 | Kaczmarczyk et al. | |
| 6,904,017 B1 | 6/2005 | Meempat et al. | |
| 6,914,883 B2 * | 7/2005 | Dharanikota | 370/230.1 |
| 7,046,683 B1 * | 5/2006 | Zhao | 370/352 |
| 7,151,781 B2 | 12/2006 | MeLampy et al. | |
| 2005/0041648 A1 | 2/2005 | Bharatia et al. | |
| 2006/0077962 A1 * | 4/2006 | Wu et al. | 370/352 |
| 2006/0250959 A1 * | 11/2006 | Porat | 370/230 |
| 2007/0019544 A1 | 1/2007 | Ashwood Smith et al. | |
| 2007/0036151 A1 | 2/2007 | Baeder | |
| 2007/0076603 A1 | 4/2007 | MeLampy et al. | |
| 2008/0049787 A1 * | 2/2008 | McNaughton et al. | 370/468 |

OTHER PUBLICATIONS

Yenra: VOIP: Session Border Controller [online], dated Oct. 18, 2004, [retrieved on Dec. 20, 2004]. Retrieved from the Internet: <URL: http://www.yenra.com/session-border-controller/> (2 pages).
Acme Packet, Inc., "Session Admission Control: Interactive Communication SLAs over Skinny Pipes" (2002)(14 pages).
International Search Report and Written Opinion for International Application No. PCT/US07/66627, mailed May 21, 2008, 6 pages.

* cited by examiner

*Primary Examiner*—Ricky Ngo
*Assistant Examiner*—Pao Sinkantarakorn
(74) *Attorney, Agent, or Firm*—Jenkins, Wilson, Taylor & Hunt, P.A.

(57) ABSTRACT

A method includes receiving at an ingress session exchange device a call admission control (CAC) condition and a CAC value associated with an endpoint of a first egress session exchange device and CAC-related information associated with an endpoint of a second egress session exchange device. The ingress session exchange device is at a border of a session over internet protocol network. A first call admission calculation is performed at the ingress session exchange device to determine whether the CAC condition is satisfied. A second call admission calculation is performed at the ingress session exchange device when the CAC condition is unsatisfied. The first call admission calculation and second call admission calculation are based on the CAC-related information.

18 Claims, 5 Drawing Sheets

| Time Value 400 | CAC Value 410 | Projected CAC value 420 | CAC Limit 430 |
|---|---|---|---|
| A | 5 | | 10 |
| B | 4 | | 10 |
| C | 7 | | 10 |
| D | 10 | | 10 |
| E | | 11 | 10 |
| F | 10 | | 10 |
| G | 6 | | 10 |

METHODS AND APPARATUS FOR PREDICTIVE CALL ADMISSION CONTROL WITHIN A MEDIA OVER INTERNET PROTOCOL NETWORK

RELATED APPLICATION

The present application claims priority to the commonly owned U.S. Provisional Patent Application No. 60/882,253, entitled "Methods and Apparatus for Predictive Global Call Admission Control within a Session over Internet Protocol Network," filed on Dec. 28, 2006, which is incorporated herein by reference in its entirety.

BACKGROUND

The invention relates generally to call admission control, and, in particular, to predictive global call admission control within a media over Internet Protocol network.

Call admission controls (CAC) limits are often used in a media over Internet Protocol (MoIP) network to prevent over subscription of components within the MoIP network. For example, CAC conditions are often used at egress points within a MoIP network to control the number of calls routed through components at any given time. CAC conditions are typically applied at the egress points because egress points have access to real-time call data. When an ingress point hunts for an endpoint that is ready to accept a call and establish a session, an ingress point is typically required to send serially a session request and wait for a response from each of several egress points as they apply CAC conditions to determine whether or not call capacity is available. Thus, a need exists for a method and apparatus for applying CAC conditions at an ingress points of a MoIP network.

SUMMARY OF THE INVENTION

In one embodiment, a method includes receiving at an ingress session exchange device a call admission control (CAC) condition and a CAC value associated with an endpoint of a first egress session exchange device and CAC-related information associated with an endpoint of a second egress session exchange device. The ingress session exchange device is at a border of a session over internet protocol network. A first call admission calculation is performed at the ingress session exchange device to determine whether the CAC condition is satisfied. A second call admission calculation is performed at the ingress session exchange device when the CAC condition is unsatisfied. The first call admission calculation and second call admission calculation are based on the CAC-related information.

BRIEF DESCRIPTION OF THE DRAWINGS

FIG. 4 is a table that illustrates call admission control (CAC) values and corresponding time values that are used to calculate a predictive CAC value, according to an embodiment of the invention.

DETAILED DESCRIPTION

Figure 1:
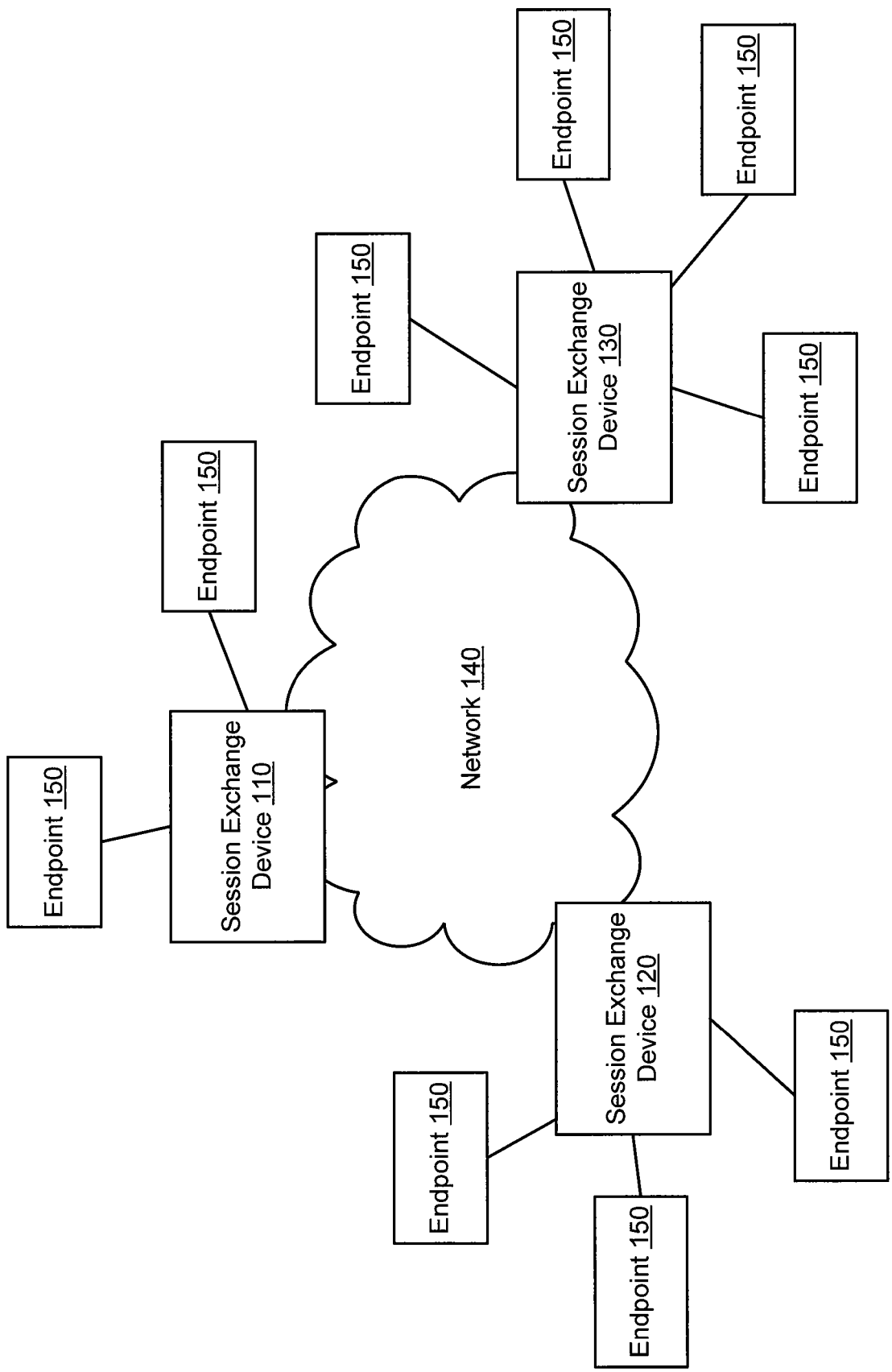
FIG. 1 is a schematic diagram that illustrates session exchange devices in communication with a network, according to an embodiment of the invention.

Session exchange devices at the borders of a media over Internet Protocol (MoIP) network can be configured to control and/or manage traffic into and out of the MoIP network. For example, a call (e.g., Voice over Internet Protocol (VoIP) call, Session over Internet Protocol (SoIP) call) from a source endpoint disposed outside of the MoIP network can be received at an ingress session exchange device (i.e., entry point session exchange device) and routed through the MoIP network to an egress session exchange device (i.e., exit point session exchange device) that can forward the call to a destination endpoint. The egress session exchange device can also forward the call to network resources outside of the MoIP network that are configured to route the call to the destination endpoint. Because multiple session exchange devices can reside at the borders of the MoIP network, an ingress session exchange device that receives a call can route the call through the MoIP network to one of several session exchange devices that can function as an egress device. The routing can be performed, in part, by defining a session request to route the call.

The ingress session exchange device can be configured to route (e.g., trigger routing of) the call through the MoIP network to an egress device based on, for example, the call capacity of outside network resources and/or destination endpoints in communication with the egress device. For example, the ingress session exchange device can route a call to a particular egress device based on a call admission determination associated with a network resource in communication with the egress device. Ingress session exchange devices can be configured to receive and use call admission control (CAC)-related information to make call admission and/or routing determinations for an incoming call from a source endpoint. The CAC-related information is open systems interconnections (OSI) layer-5 information that includes, but is not limited to CAC values/data, CAC metadata, and CAC conditions (e.g., CAC limits) related to network resources and/or destination endpoints (e.g., intermediate endpoints) in communication with an egress device. The CAC-related information, which is used by an egress device to make call admission determinations in response to a session request from an ingress device, can be acquired/produced at the egress device and sent to an ingress device for use at the ingress device. The call admission and/or routing determinations (e.g., calculations) can be used to define a session request that can be sent from the ingress session exchange device to one of several egress session exchange devices.

By using the CAC-related information at the ingress device rather than at the egress device to make call admission and/or routing determination associated with an incoming call, network resources (e.g., switches, routers, cables) between the egress device and ingress device may be more efficiently used. For example, the ingress device can use CAC-related information to calculate an appropriate route and/or destination endpoint with a high probability of accepting an incoming call rather than using network resources to serially hunt for an available resource through egress devices. An ingress device can use the CAC-related information to promote a bandwidth sharing profile (e.g., level-loading) between multiple egress devices and/or multiple destination endpoints outside of, for example, a MoIP network. An ingress device can make call admission determinations and/or routing determinations to decrease or increase traffic on particular destination endpoints or egress devices.

In some embodiments, an ingress device can also be configured to use historical CAC-related information to determine whether or not an incoming call from a source endpoint can be accepted by an egress device and/or destination endpoint. For example, an ingress device can use the CAC-related information to predict whether or not a destination endpoint or egress device will be able to accept a call at a specified time or period of time when CAC-related information associated with that specified point in time or time period is not available. Predictions can be calculated based on a variety of mathematical algorithms and/or equations that include, for example, one or more prediction index values. In some embodiments, the ingress device can make call admission determinations and/or call routing determinations based on a collection of CAC-related information associated with one or more egress devices and/or destination endpoints (i.e., global CAC-related information).

FIG. 1 is a schematic diagram that illustrates session exchange devices 110, 120, and 130 in communication with a network 140, according to an embodiment of the invention. The network 140 can be a wireless or wired network configured to transmit data and/or media content such as voice content and/or video content. For example, portions of the network 140 can be used for MoIP sessions such as VoIP sessions. The session exchange devices 110, 120, and 130 can be, for example, multi-protocol session exchange devices configured to operate as session border controllers for the network 140. The session exchange devices 110, 120, and 130 each are configured to establish, control, and monitor connections between one or more endpoints 150. The session exchange devices 110, 120, and 130 can be connected with a network controller (not shown) that is a centralized management component that controls, configures, and coordinates the network 140. The session exchange devices 110, 120, and 130 can be configured to modify routing of calls using, OSI layer 5 parameters (e.g., CAC-related information) and/or OSI layer 3 parameters.

Each of the session exchange devices 110, 120, and 130 are in communication with at least one endpoint 150. In some embodiments, more than one of the session exchange device 110, 120, and/or 130 can be in communication with a single endpoint 150. The session exchange devices 110, 120, and/or 130 can be configured as ingress session exchange devices and/or egress session exchange devices that process incoming and/or outgoing calls. The endpoints 150, likewise, can be source and/or destination endpoints.

Each of the session exchange devices 110, 120, and 130 is configured to send periodically or continuously CAC-related information associated with their respective endpoints 150 to other session exchange devices 180. For example, session exchange device 120 can be configured to send CAC-related information associated with one or more of its endpoints 150 to session exchange devices 110 and/or 130. The CAC-related information can be sent based on, for example, a list of CAC parameters or a user-defined policy. In some embodiments, the CAC-related information can be, for example, broadcast to other devices using routing update protocols such as open shortest path first (OSPF), routing information protocol (RIP), and/or telephony routing over Internet Protocol (TRIP).

Each of the session exchange devices 110, 120, and 130 can be configured to receive, store, and/or process the CAC-related information received from other session exchange devices 110, 120, and/or 130 so that each session exchange device 110, 120, and/or 130, when acting as an ingress device, can make call admission determinations. The call admission determinations (i.e., whether or not a call can be admitted by one or more endpoints 150) can be used to make routing decisions. Each of the session exchange devices 110, 120, and 130 can be configured to process the CAC-related information, for example, when determining whether or not to route (e.g., trigger routing of) a call received at the session exchange device from an endpoint 150 to another endpoint associated with a different session exchange device 110, 120, and/or 130.

By sending the CAC-related information to each of the session exchange devices 110, 120, and 130, the call admission processing can be performed at each of the session exchange devices 110, 120, and 130. In other words, the routing decisions can be distributed to each of the session exchange devices 110, 120, and 130 without relying on a centralized routing engine. Distributing the call admission determinations to ingress session exchange devices allows for efficient scalability of a network of session exchange devices because the session exchange devices are not required to rely on a centralized routing engine.

For example, session exchange device 130, when acting as an ingress device, can use CAC conditions and CAC values associated with endpoints 150 in communication with session exchange device 120 to determine whether or not to route an incoming call to any one of the endpoints 150 in communication with session exchange device 120. If, for example, the endpoints 150 in communication with session exchange device 120 are determined to be at capacity based on a call admission determination, the session exchange device 130 can request that a session be established with session exchange device 110. In other words, a routing determination can be made based on whether a CAC condition is satisfied or unsatisfied based on one or more CAC values. Depending upon the structure of the CAC condition, the CAC condition can be satisfied or unsatisfied, for example, when a CAC limit is exceeded.

Also, session exchange device 130 can determine based on a global policy whether or not resources could be more appropriately used if a particular call is routed to, for example, an endpoint 150 associated with session exchange device 120 rather than an endpoint 150 associated with session exchange device 110. In other words, session exchange device 130 can make routing determinations based on a global view of resources associated with the other session exchange devices 110, and 120. More detailed examples of call routing at session exchange devices are described below in connection with FIG. 2.

The CAC-related information can be sent from any of the session exchange devices 110, 120, and/or 130 to other session exchange devices 110, 120, and/or 130 at specified times, at specified time intervals, in response to a global or individual trigger signal, and/or when a specified threshold level of CAC-related information is, for example, stored at any of the session exchange device 110, 120, and/or 130. Any of the session exchange devices 110, 120, and 130 can be configured to send CAC-related information to one or more specified session exchange devices 110, 120, and/or 130, for example, in response to an instruction or trigger signal. The instruction can be, for example, a policy (e.g., user-defined policy) that defines which CAC-related information is to be collected and/or sent.

The endpoints 150 can be, for example, a public switched telephone network (PSTN), a broadband network that can provide network access to broadband consumers, an enterprise network, an H.323 network, a session initiation protocol (SIP) softswitch network, or a SIP network. An endpoint 150 can also be an individual phone/computer terminal or an access point (e.g., another SBC) to another MoIP network. Of course, the various endpoints 150 can include any combination of the above examples. Each of the endpoints 150 is an endpoint from the perspective of the individual session exchange device 110, 120, and/or 130 that is in communication with that endpoint 150. The session exchange devices 110, 120, and 130 can operate as multi-protocol session exchange devices that function as interface devices between different types of endpoints 150 (e.g., networks). For example, the session exchange devices 110, 120, and 130 can be configured to translate a protocol from one endpoint 150 into a protocol associated with a different endpoint 150.

Figure 2:
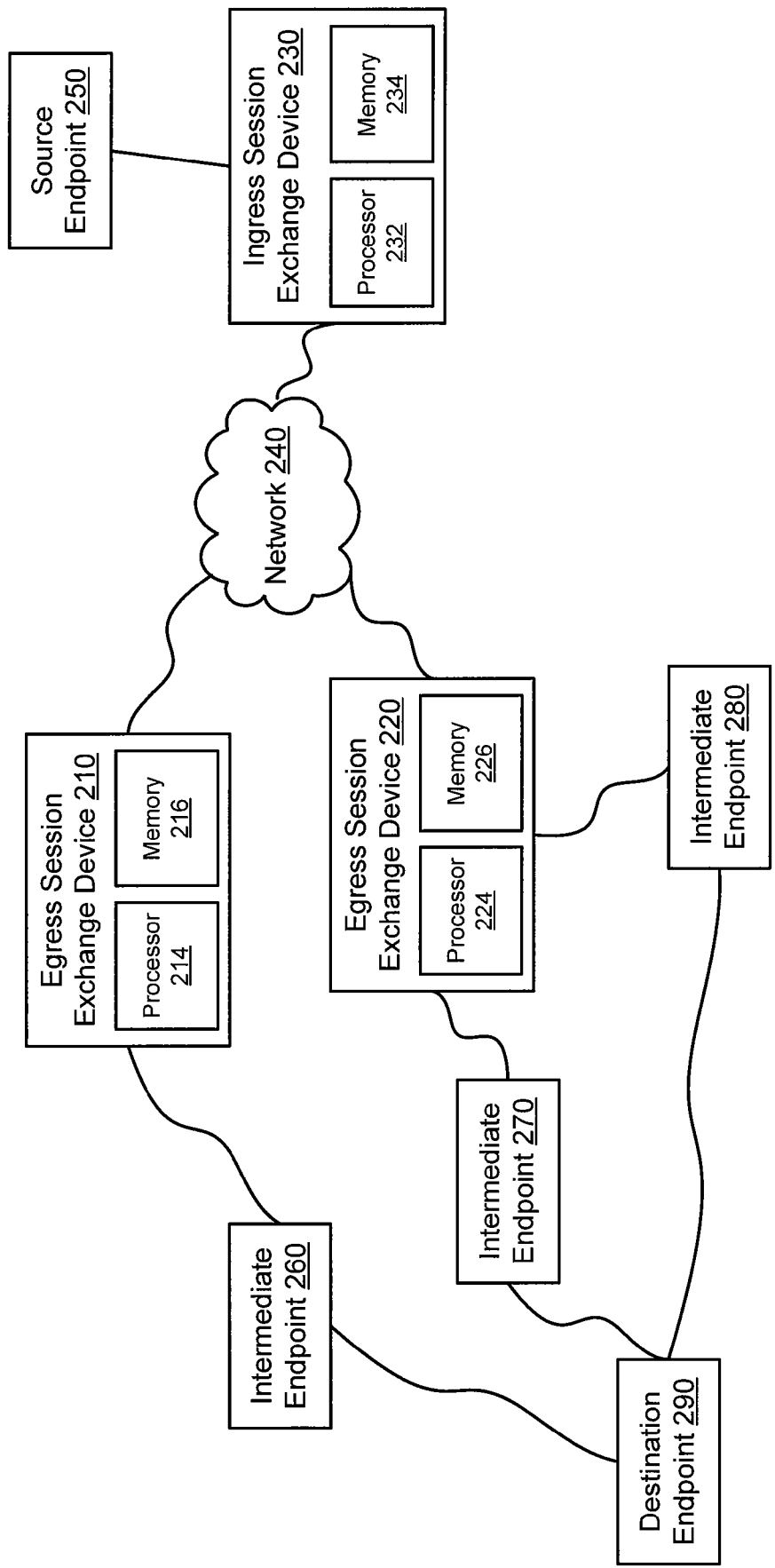
FIG. 2 is a schematic diagram that illustrates an ingress session exchange device and an egress session exchange device in communication with a network, according to an embodiment of the invention.

FIG. 2 is a schematic diagram that illustrates an ingress session exchange device 230 and two egress session exchange devices 210 and 220 in communication with a network 240, according to an embodiment of the invention. The ingress session exchange device 230 is configured to receive (e.g., via an input port (not shown)) an incoming call from a source endpoint 250 such as a VoIP phone. The egress session exchange device 210 is in communication with an intermediate endpoint 260 and the egress session exchange device 220 is in communication with two intermediate endpoints 270 and 280. The intermediate endpoints 260, 270, and 280 are endpoints from the perspective of their respective egress session exchange devices 210 and 220. The intermediate endpoints 260, 270 and 280 are in communication with a destination endpoint 290. The incoming call request from the source endpoint 250 can be routed to the destination endpoint 290 through any one of the egress session exchange devices 210 and 220. The ingress session exchange device 230 and egress session exchange devices 210 and 220 are configured to establish sessions such that the source endpoint 250 and the destination endpoint 290 can engage in a media content exchange such as a voice signal exchange (i.e., VoIP). A session is a connection used for exchanging internet protocol (IP) packets (e.g., data packets, media content packets) and established using the session layer of the OSI model. A session can be established using a protocol such as session initiation protocol (SIP).

The devices and endpoints in FIG. 2 are arranged such that a call is processed in one direction to simplify the discussion. The ingress session exchange device 230 is configured to request a session for the incoming call from the source endpoint 250. In some embodiments, for example, the destination endpoint 290 can be an endpoint that initiates a call, in which case the destination endpoint 290 would be functioning as a source endpoint. The egress session exchange devices 210 and 220 can be in communication with multiple destinations and/or additional intermediate endpoints (not shown) in addition to the intermediate endpoints 260, 270 and 280. Also, each of the intermediate endpoints 260, 270 and 280 can be in communication with additional destination endpoints (not shown) and/or intermediate endpoints (not shown) in addition to destination endpoint 290.

The ingress session exchange device 230 can be configured to determine which of the egress session exchange devices 210 or 220 can be used to establish ingress and egress sessions for the incoming call of the source endpoint 250 so that the call can be forwarded to the destination endpoint 290. In other words, the ingress session exchange device 230 can determine whether or not the incoming call can be routed through the egress session exchange devices 210 and 220. This determination is based on CAC-related information associated with the intermediate endpoints 260, 270 and/or 280.

For example, the ingress session exchange device 230 can determine, using the CAC-related information, whether any of the intermediate endpoints 260, 270 and 280 have capacity to accept an incoming call. If intermediate endpoint 270 can accept a call based on the CAC-related information processed at the ingress session exchange device 230, ingress session exchange devices 230 can request that a session be established between egress session exchange device 220 and ingress session exchange device 230. If the egress session exchange device 220 accepts the request, a session can be established between the egress session exchange device 220 and the ingress session exchange device 230. This session will be an ingress session from the perspective of the egress session exchange device 220. The egress session exchange device 220 can then request a session (i.e., egress session from the perspective of the egress session exchange device 220) be established with the intermediate endpoint 270 so that the incoming call can be forwarded to the destination endpoint 290 through the intermediate endpoint 270.

The egress session exchange devices 210 and 220 are configured to send CAC-related information to the ingress session exchange device 230 because the egress session exchange devices 210 and 220, respectively, are in communication with the intermediate endpoints 260, 270 and 280 and can directly acquire the CAC-related information. The CAC-related information is received at the ingress session exchange device 230 (e.g., via an input port (not shown)) from the egress session exchange devices 210 and 220 and stored in a memory 234.

The ingress session exchange device 230 can process the CAC-related information stored in the memory 234 at processor 232 to determine which of the egress session exchange devices, 210 or 220 can accept the incoming call from source endpoint 250. The ingress session exchange device 230, based on this determination, can define a request to trigger the establishment of sessions (e.g., using a particular device) for the incoming call. The CAC-related information can be retrieved from the memory 234 and manipulated by the processor 232 at ingress session exchange device 230 before being used to make a call acceptance/routing determination. For example, CAC-related information associated with one or more of the endpoints 270 and/or 280 can be averaged or otherwise mathematically manipulated.

The ingress session exchange device 230 can receive at least three types of CAC-related information: CAC conditions, CAC values, and/or CAC metadata. The CAC conditions are conditions (e.g., threshold limits) that can be used to determine whether or not, for example, an incoming call can be accepted by and/or routed to one or more of the intermediate endpoints 260, 270 and/or 280 through the respective egress session exchange devices 210 and 220. If an incoming call can be accepted, a session request can be defined and sent to, for example, at least one of the egress session exchange devices 210 or 220 to route the call. The intermediate endpoints 260, 270 and/or 280 can be associated with one or more different CAC conditions including, for example, global CAC limits.

The CAC values are values that can be used to make a call admission determination based on a corresponding CAC condition. The CAC conditions and/or CAC values can be related to any parameter value that can be used to make a call admission determination. For example the CAC values and/or conditions (e.g., limits) can be related to bandwidth, numbers of calls, percent utilization, and so forth. A CAC value, for example, can be associated with one or more intermediate endpoints 260, 270 and/or 280. In some embodiments, CAC values that are not associated with a CAC condition can also be received at the ingress session exchange device 230. In some embodiments, a CAC condition is satisfied when, for example, a call limit is exceeded.

The CAC metadata is data that is associated with the CAC conditions and/or CAC values. The CAC metadata values can include, for example, a timestamp value (e.g., date and time), an address of the destination endpoint, a quality-of-service (QoS) parameter value, a security restriction value, a username, and/or a session or call identifier (ID). More details regarding data that can be associated at the session layer are set forth in co-pending application Ser. No. 11/343,218, "Session Data Records and Related Alarming within a Session Over Internet Protocol (SOIP) Network," which is incorporated herein by reference in its entirety.

If the ingress session exchange device 230, for example, receives a CAC condition that indicates that that intermediate endpoint 270 is configured to accept only 10 calls at any given time and a CAC value that indicates that the intermediate endpoint 270 is currently processing 5 calls, the ingress session exchange device 230 can determine that the intermediate endpoint 270 can accept a call originating at source endpoint 250. The ingress session exchange device 230 can define and send a request to route (e.g., trigger routing of) an incoming call from, for example, source endpoint 250 through intermediate endpoint 270. The routing can be, in part, accomplished by defining a request to establish a session between the ingress session exchange device 230 and egress session exchange device 220 because egress session exchange device 220 is in communication with intermediate endpoint 270.

In another example, the ingress session exchange device 220 can receive a CAC condition that indicates intermediate endpoint 280 is configured to process only 10 MB/s of information at any given time and receives a CAC value that indicates the intermediate endpoint 280 is currently processing 10 MB/s of information. The ingress session exchange device 230 can use this CAC condition and CAC value to determine that the intermediate endpoint 280 cannot accept a call originating at source endpoint 250 because the intermediate endpoint 280 is already operating at capacity (e.g., CAC condition is not satisfied). Based on this determination, the ingress session exchange device 230 can, for example, define and send a request (e.g., session request) to route (e.g., trigger routing of) an incoming call through a different intermediate endpoint such as intermediate endpoint 270.

The CAC-related information associated with each of the endpoints 260, 270 and/or 280 can be acquired, defined, and/or stored by the egress session exchange device 220 before being sent to the ingress session exchange device 230 (e.g., via an output port at egress session exchange device 220 (not shown)). For example, some CAC-related information can be collected at the egress session exchange device 220 as sessions/calls are established through any endpoints such as intermediate endpoints 270 and 280. The egress session exchange device 220, for example, can be configured to store (e.g., log) CAC-related values associated with the session/call in a memory 226. The egress session exchange device 220 can store, for example, CAC metadata such as a time of the session/call, an address of the source endpoint, an address of the destination endpoint, and/or a quality-of-service (QoS) parameter value.

Some CAC-related information such as CAC conditions can be defined at the egress session exchange devices 210 and/or 220 by, for example, a network administrator based on a global policy or sent to the egress session exchange device 210 and/or 220 for storage on the memory 226. Each of the intermediate endpoints 260, 270 and 280 can be associated with one or more different CAC conditions or one or more global CAC conditions. In some embodiments, the egress session exchange devices 210 and/or 220, respectively, can be configured to send the CAC-related information associated with the intermediate endpoints 260, 270 and/or 280 without storing the CAC-related information in their respective memories 216 and 226.

In some embodiments, the ingress session exchange device 230 can request that specified CAC-related information be sent from the egress session exchange devices 210 and/or 220 so that the ingress session exchange device 230 can route a particular call that has been initiated at the source endpoint 250. For example, the ingress session exchange device 230 can request from egress session exchange devices 210 and/or 220 the most recent bandwidth measurement values associated with their respective intermediate endpoints 260, 270 and/or 280. The ingress session exchange device 230, when it receives the bandwidth measurement values, can use the bandwidth measurement values to make a call admission determination and subsequently define a request for a session using a particular device (e.g., routing request).

In some embodiments, the egress session exchange devices 210 and/or 220 can be used to confirm/validate the routing/call acceptance determination calculated by the ingress session exchange device 230. The ingress session exchange device 230 can request, for example, that an incoming call from source endpoint 250 be routed through egress session exchange device 210 (i.e., ingress and/or egress sessions established at egress session exchange device 210). The request can be defined based on a routing determination calculated using CAC-related information received from egress session exchange device 220. When the request to route the incoming call through the egress session exchange device 210 is received, the egress session exchange device 210 can use CAC-related information to verify that the routing determination calculated by ingress session exchange device 230 is appropriate.

For example, if recent CAC-related information indicates that intermediate endpoint 260 cannot accept the incoming call based on a new CAC condition or additional CAC-related values, egress session exchange device 210 can deny the request to establish a ingress and/or egress sessions for the incoming call. In response to the denial, the ingress session exchange device 230 can make a different call admission/routing determination such as egress session exchange device 220. In some embodiments, ingress session exchange device 230 can be required to hunt for a different egress session exchange device (not shown) that has, for example, the capacity to establish ingress and/or egress sessions for the incoming call to destination endpoint 290.

Figure 3:
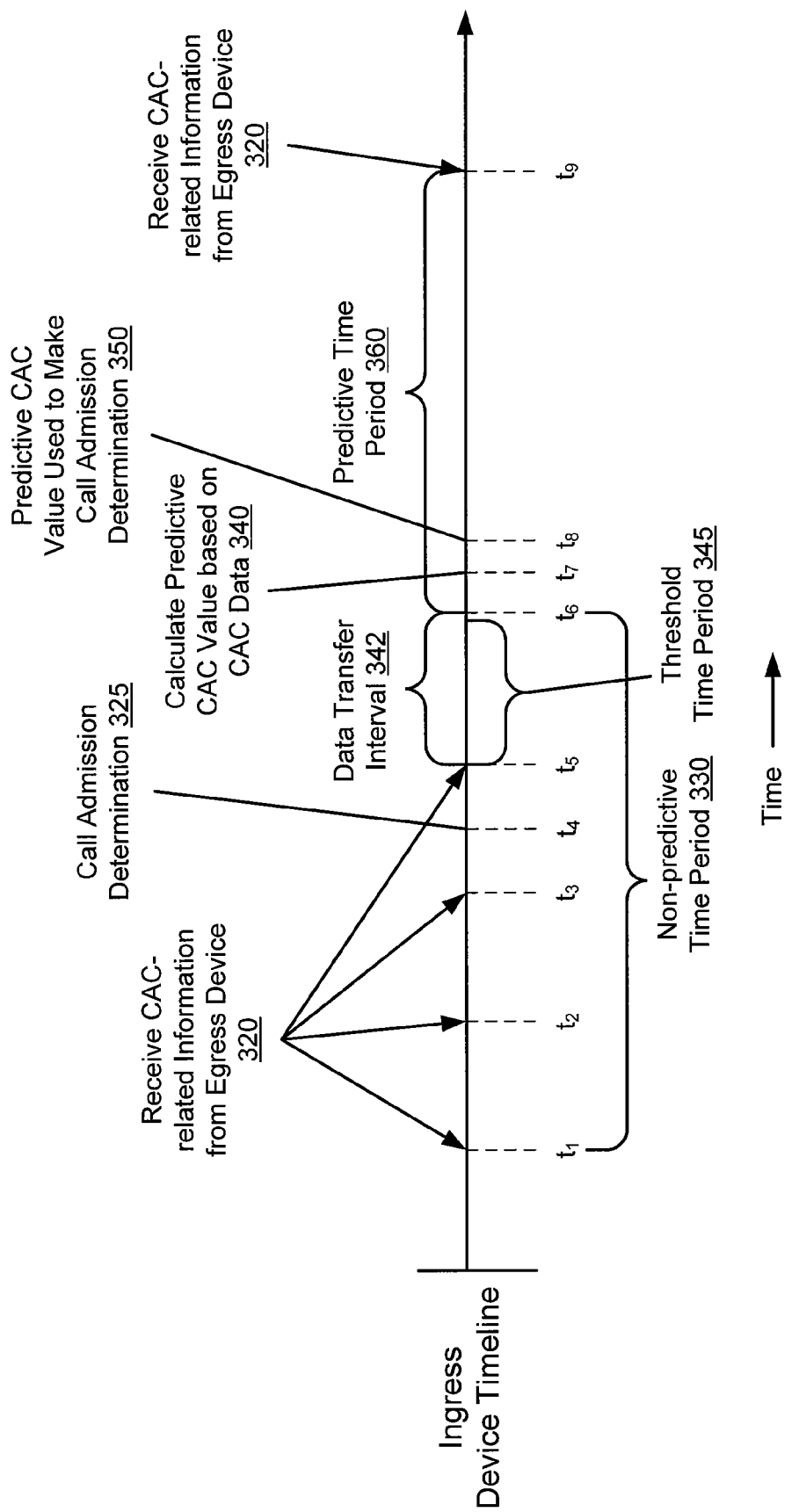
FIG. 3 is a schematic diagram of a timeline that illustrates the receipt and processing of information at an ingress device, according to an embodiment of the invention.

In some embodiments, CAC-related information stored at an ingress device can be used to predict whether or not a call can be accepted at a particular device in communication with an egress device at a specified time. FIG. 3 is a schematic diagram of a timeline that illustrates the receipt and processing of information at an ingress device, according to an embodiment of the invention. The timeline illustrates a non-predictive time period 330 (between times $t_1$ and $t_6$) and a predictive time period 360 (between times $t_6$ and $t_9$). CAC-related information received at the ingress device during the non-predictive time period 330 is used to make call admission determinations during the predictive time period 360.

During the non-predictive time period 330 CAC-related information, such as CAC values, CAC metadata, and/or CAC conditions, are received from one or more egress devices at times $t_1$, $t_2$, $t_3$, $t_5$, and $t_9$. Although the CAC-related information 320 are received at regular intervals, in some embodiments, the CAC-related information 320 can be received at irregular time intervals or in response to a request for CAC-related information. As shown in FIG. 3, a call admission determination is made at time $t_4$ based on the CAC-related information received during the non-predictive time period.

In this embodiment, CAC-related information received during the non-predictive time period 330 is used to calculate a predictive CAC value 340 during the predictive time period 360 at time $t_7$. The predictive CAC value can also be referred to as a projected CAC value. In this embodiment, the predictive CAC value calculated at time $t_7$ is used to make a call admission determination 350 at time $t_8$ based on a CAC condition. In some embodiments, the predictive CAC value calculated at time $t_7$ can be used until the predictive CAC value is considered stale. For example, the predictive CAC value may only be used (e.g., valid) for a specified period of time after the predictive CAC value has been calculated (e.g., a threshold time period). Whether or not a predictive CAC value is stale can be determined based on, for example, CAC metadata values associated with the predictive CAC value (e.g., timestamp).

In this embodiment, the predictive time period 360 is triggered (e.g., started) when CAC-related information is not received from the egress device, for example, for more than a threshold period of time 345. The time periods between transfers of CAC-related information can be referred to as data transfer intervals. This threshold period of time 345 can be referred to as a predictive triggering threshold value. As shown in FIG. 3, data transfer interval 342 (the time period between $t_5$ and $t_6$) exceeds the threshold period of time 345.

As shown in FIG. 3, the predictive time period 360 is terminated (e.g., ended) when CAC-related information is once again received at time $t_9$. In some embodiments, the predictive time period 360 can be triggered when, for example, a CAC value from a set of CAC values exceeds a threshold limit (e.g., statistically significant aberration). In some embodiments, the predictive time period is relatively short compared with the non-predictive time period.

In some embodiments, an ingress device can be configured to calculate predictive CAC values and make call admission determinations and/or routing determination during predictive time periods between, for example, regularly scheduled CAC-related information updates. In some embodiments, the predictive CAC values can be calculated periodically and/or continuously during predictive time period 360 and stored in a memory or database. The predictive CAC values can be used, when needed, to determine whether or not a device can accept an incoming call from the ingress device.

The predictive values can be calculated using a variety of mathematical equations and/or algorithms. For example, if a CAC value received at $t_x$ has value $C_x$ and a CAC value at $t_y$ has value $C_y$, then a predictive CAC value $C_n$ at any time instance of n seconds after $t_y$ can be calculated using equation 1 below:

$$C_n = C_y + \left[\frac{(C_y - C_x)}{(t_y - t_x)}\right] \times n \quad (1)$$

Using equation 1, the rate of change (e.g., trend) in the CAC values between two CAC-related information updates (at times $t_x$ and $t_y$) is multiplied with the number of seconds passed (n) since the last CAC value (at time $t_y$) and added to the last CAC value ($C_y$) received (at time $t_y$). The new value ($C_n$) can be used as the predicted CAC value at n seconds after the last CAC value received at time $t_y$.

In some embodiments, a prediction index can be used to calculated a predictive CAC value. The prediction index can be a numerical value that specifies the number of previous CAC values (e.g., consecutive or non-consecutive) to be used when calculating a predictive CAC value. For example, an index of zero can be used to indicate that only the last CAC value received from an egress device will be used to calculate a predictive CAC value.

Alternatively, Equation 2 below is an equation that can be used to calculate a predictive CAC value ($C_n$) based on a prediction index (i) and after n seconds has passed from the last CAC value was received from an egress device:

$$C_n = C_i + \left[\frac{\sum_{j=1}^{i} \frac{(C_j - C_{j-1})}{(t_j - t_{j-1})}}{i}\right] \times n \quad (2)$$

Equation 2 is defined such that a predictive CAC value ($C_n$) is calculated based on a sliding window average of CAC values $C_j$ through $C_{j-1}$ over a time period $t_j$ through $t_{j-1}$. Using this equation, a larger prediction index value can be used to produce a predictive CAC value that is less sensitive to varying and/or recent CAC values and vice versa.

FIG. 4 is a table 450 that illustrates CAC values 410 and corresponding time values 400 that are used to calculate a predictive CAC value 420, according to an embodiment of the invention. The time values in column 400 are time values that can be measured in, for example, seconds or minutes and the CAC values in column 410 can be, for example, numbers of calls. CAC values 410 that correspond to the time values in column 400 are used to calculate the predictive CAC value of 11 shown in column 420 at time E. The predictive CAC value of 11 can be calculated based on, for example, equation 2. Based on the constant CAC limit of 10 shown in column 430, the device associated with the CAC values shown in column 410 would not be able to accept a call at time E.

Figure 5:
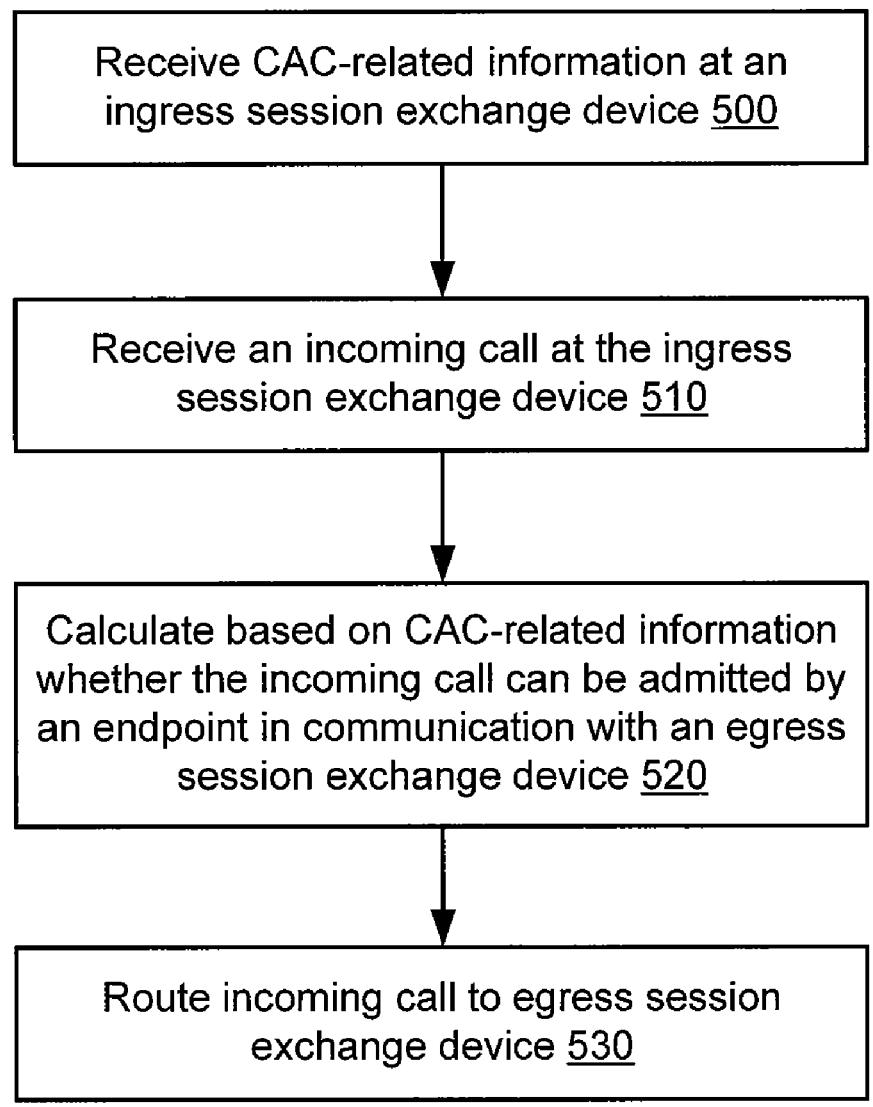
FIG. 5 is a flowchart that illustrates a method for routing an incoming call to one of several egress session exchange devices, according to an embodiment of the invention.

FIG. 5 is a flowchart that illustrates a method for routing an incoming call to one of several egress session exchange devices, according to an embodiment of the invention. The flowchart illustrates that CAC-related information is received at an ingress session exchange device at 500. The CAC-related information can be information broadcast from several egress session exchange devices within, for example, a VoIP or SoIP network.

At 510 an incoming call is received at the session exchange device. The incoming call can be received from, for example, an IP phone or video conference phone. The CAC-related information, in some embodiments, can be received after the incoming call is received.

The CAC-related information is used by the ingress device to calculate whether or not the incoming call can be admitted by an endpoint in communication with an egress session exchange device at 520. The egress session exchange device can be one of multiple possible egress session exchange devices that can potentially forward the incoming call to a destination endpoint. The admission determination is based on whether a CAC condition associated with the CAC-related information is satisfied or unsatisfied.

If the endpoint can be accepted by an endpoint in communication with the egress session exchange device, the incoming call is routed to the egress session exchange device at 530. When a call is routed to the egress session exchange device, the incoming call can be routed via several segments within an OSI layer 3 path. Routing from a first session exchange device to a second session exchange device can be a single hop at the OSI layer 5 session layer. For example, the call can be routed by defining and sending a session request to the egress session exchange device.

If the incoming call cannot be immediately accepted by any egress session exchange devices, the ingress device can deny the call, can request additional CAC-related information from one or more egress session exchange devices so that an updated CAC-related calculation can be performed, can forward the incoming call to an egress session exchange device based on a user-defined criteria, or hold the call until it is determined that an endpoint associated with an egress session exchange device can accept the incoming call.

Some embodiments of the invention relate to a storage product with a processor-readable medium having instructions or code thereon for performing various processor-implemented operations. The media and code may be those specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of code include, but are not limited to, control signals, encrypted code, and compressed code.

In conclusion, among other things, a method and apparatus for processing CAC-related information at an ingress device is described. While various embodiments of the invention have been described above, it should be understood that they have been presented by way of example only, and various changes in form and details may be made. For example, an ingress device can be configured to simultaneously process CAC-related information for multiple incoming calls.

What is claimed is:

1. A method, comprising:
   receiving at an ingress session exchange device a call admission control (CAC) condition and a CAC value associated with an endpoint of a first egress session exchange device and CAC-related information associated with an endpoint of a second egress session exchange device, the ingress session exchange device being at a border of a session over internet protocol network, wherein the CAC-related information is associated with a non-predictive time period;
   calculating a predictive-CAC value based on the CAC-related information that is valid during a predictive time period being after the non-predictive time period when the CAC-related information associated with the predictive time period is not available;
   performing a first call admission calculation at the ingress session exchange device to determine whether the CAC condition is satisfied, the first call admission calculation being based on the predictive-CAC value; and
   performing a second call admission calculation at the ingress session exchange device when the CAC condition is unsatisfied, the second call admission calculation being based on the predictive-CAC value.

2. The method of claim 1, wherein the determining includes determining in response to the ingress session exchange device receiving a session request associated with an incoming call.

3. The method of claim 1, wherein a result of the second call admission calculation indicates a capacity of the second session exchange device to receive a session request associated with an incoming call received at the ingress session exchange device.

4. The method of claim 1, further comprising:
   defining a session request based on the second call admission calculation; and
   sending the session request to the second egress session exchange device.

5. The method of claim 1, wherein the CAC-related information includes a set of CAC values and the predictive-CAC value calculated at the ingress session exchange device is based on the set of CAC values.

6. The method of claim 1, wherein the second call admission calculation is based on a predictive-CAC value.

7. The method of claim 1, wherein the receiving includes receiving at least one of the CAC condition, the CAC value, or the CAC-related information from at least one of the first egress session exchange device or the second egress session exchange device using a routing update protocol.

8. The method of claim 1, wherein the CAC-related information associated with the endpoint of the second egress session exchange device is session-layer information.

9. The method of claim 1, wherein the receiving includes receiving at an ingress session exchange device CAC metadata associated with the CAC condition and the CAC value, the performing the first call admission calculation includes performing based on the CAC metadata.

10. A method, comprising:
    receiving, at a first session exchange device, historical call admission control (CAC)-related information from a second session exchange device, the historical CAC-related information being associated with a non-predictive time period and an endpoint in communication with the second session exchange device, the first session exchange device being disposed at a first border location of a session over internet protocol network, the second session exchange device being disposed at a second border location of the session over internet protocol network, the CAC-related information including at least one of a CAC value, a CAC-metadata value, or a CAC condition;
    calculating, during a predictive time period and at the first session exchange device, a predictive-CAC value associated with the endpoint in communication with the second session exchange device based on the historical CAC-related information, the predictive time period being a period of time after the non-predictive time period when historical CAC-related information associated with the specified time or period of time is not available; and
    predicting whether or not the second session exchange device can accept a call during the predictive time period based on the predictive-CAC value.

11. The method of claim 10, further comprising:
    receiving a session request associated with an incoming call at the first session exchange device; and
    performing a call admission calculation based on the predictive-CAC value at the first session exchange device in response to the receiving the session request.

12. The method of claim 10, wherein the predictive-CAC value is a first predictive-CAC value, the calculating includes calculating at a first time during the predictive time period, the first predictive-CAC value is a valid value during a portion of the predictive time period, the method further comprising:
calculating at a second time during the predictive time period a second predictive-CAC value, the second time being after the portion of the predictive time period.

13. The method of claim 10, wherein the CAC-related information is a first set of CAC-related information, the calculating includes calculating at a first time during the predictive time period, the method further comprising:
receiving at a second time at the first session exchange device a second set of CAC-related information from the second session exchange device, a non-predictive time period being triggered in response to the receiving at the second time, the second time being after the first time.

14. The method of claim 10, further comprising:
receiving a session request associated with an incoming call at the first session exchange device during the predictive time period, the calculating includes calculating in response to the receiving the session request.

15. The method of claim 10, further comprising:
defining a session request at the first session exchange device in response to the predictive-CAC value satisfying the CAC condition, the session request being associated with an incoming call received at the first session exchange device, the session request being configured to trigger establishment of a session between the first session exchange device and the second session exchange device; and
sending the session request to the second session exchange device.

16. The method of claim 10, wherein at least a portion of the CAC-related information is retrieved by the second session exchange device and sent to the first session exchange device from the second session exchange device.

17. A method comprising:
receiving, at a first session exchange device, historical call admission control (CAC)-related information from a second session exchange device, the CAC-related information being associated with an endpoint in communication with the second session exchange device, the first session exchange device being disposed at a first border location of a session over internet protocol network, the second session exchange device being disposed at a second border location of the session over internet protocol network, the CAC-related information including at least one of a CAC value, a CAC-metadata value, or a CAC condition;
calculating at the first session exchange device, a predictive-CAC value associated with the endpoint in communication with the second session exchange device based on the CAC-related information;
wherein the predictive-CAC value is a first predictive-CAC value, the calculating includes calculating at a first time during a predictive time period, the first predictive-CAC value is a valid value during a portion of the predictive time period; and
the method further comprising:
calculating at a second time during the predictive time period a second predictive-CAC value, the second time being after the portion of the predictive time period, wherein the CAC-related information is associated with a non-predictive time period, the calculating includes calculating during a predictive time period after the non-predictive time period, the predictive time period is triggered when a duration of a data-transfer-interval exceeds a threshold time period, the data-transfer-interval begins at the first time.

18. A method, comprising:
receiving, at an ingress session exchange device, call admission control (CAC)-related information associated with at least one of a first endpoint of a first egress session exchange device or a second endpoint of a second egress session exchange device, the CAC-related information including at least one of a CAC condition or a CAC value, the ingress session exchange device being at a border of a session over internet protocol network, wherein the CAC-related information is associated with a non-predictive time period;
calculating a predictive-CAC value based on the CAC-related information that is valid during a predictive time period being after the non-predictive time period when the CAC-related information associated with the predictive time period is not available; and
defining a session request for at least one of the first egress session exchange device or the second egress session exchange device based on the predictive CAC-value.

* * * * *